United States Patent [19]

Noren

[11] 4,311,827

[45] Jan. 19, 1982

[54] CURABLE ORGANOSILICATE COATING COMPOSITIONS CONTAINING 1,3-OXAZOLIDINE CURING AGENT

[75] Inventor: Gerry K. Noren, Hoffman Estates, Ill.

[73] Assignee: DeSoto, Inc., Des Plaines, Ill.

[21] Appl. No.: 126,375

[22] Filed: Mar. 3, 1980

[51] Int. Cl.³ ...................... C08G 77/32; C08G 77/02
[52] U.S. Cl. .................................. 528/405; 423/325; 525/474; 528/27; 528/423; 528/425
[58] Field of Search ................ 528/405, 27, 425, 423; 423/325; 525/474

[56] References Cited

U.S. PATENT DOCUMENTS 4,089,840  5/1978  Blount ............................ 528/405

Primary Examiner—Harold D. Anderson
Attorney, Agent, or Firm—Dressler, Goldsmith, Shore, Sutker & Milnamow, Ltd.

[57] ABSTRACT

An atmospheric moisture curable coating composition containing an organosilicate having a plurality of atmospheric moisture hydrolyzable alkoxy group-to-silicon bonds and about 1% to about 50% by weight of organosilicate of a 1,3-oxazolidine curing agent, and method for curing same.

10 Claims, No Drawings

CURABLE ORGANOSILICATE COATING COMPOSITIONS CONTAINING 1,3-OXAZOLIDINE CURING AGENT

DESCRIPTION

1. Technical Field

This invention relates to curing organosilicate coating compositions, and particularly to compositions whose cure may be catalyzed by a latent amine-containing curing agent.

2. Background Art

Organosilicate coatings are usually prepared as two component systems which are mixed together shortly prior to use. One component of these systems is a resinous material having a plurality of silicon-carried alkoxy groups. This resinous material is itself usually a liquid, or is dispersed or dissolved in a solvent or other volatile material. The second component is a curing agent containing an amine such as ethanolamine or latent amine such as the ketimine formed from hexamethylenediamine and methyl iso-butyl ketone.

When the two components are mixed together, the "pot life" of the resulting mixture is usually very short, normally less than about 20 minutes. Thus, once mixed, these coating compositions must be worked with very quickly, thereby making them difficult to use.

The present invention is concerned with curing compositions in which the curing agent-containing organosilicate composition has an extended pot life, and stable single package systems are also contemplated.

3. Description of the Invention

The present invention relates to the use of 1,3-oxazolidines as latent amine-containing catalytic agents for curing organosilicate resins having a plurality of atmospheric moisture-hydrolyzable alkoxy group-to-silicon bonds (alkylsilicates). Coating compositions utilizing the 1,3-oxazolidine curing agents and organosilicates are disclosed as are methods for the use of these coating compositions. According to this invention, the "pot life" of the mixed organosilicate plus 1,3-oxazolidine curing agent is extended to at least about twice that of other, similar, tested compositions.

The curable organosilicate coating compositions of this invention contain an organosilicate having a plurality of atmospheric moisture-hydrolyzable alkoxy group-to-silicon bonds and about 1% to about 50% (preferably about 10% to about 20%) by weight of the organosilicate of a 1,3-oxazolidine curing agent having the formula:

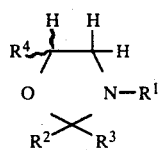

The undulating lines are conventional and denote that no stereospecificity is implied.

In the above formula, $R^1$ may be selected from the group consisting of hydrogen, branched, straight chain and cyclic monovalent alkyl and aryl groups having 1-20 carbon atoms (preferably an alkyl group having 1-6 carbon atoms).

$R^2$ and $R^3$ may be the same or different and may be selected from the group consisting of hydrogen, branched, straight chain and cyclic alkyl and aryl groups having 1-10 carbons each. $R^2$ and $R^3$ may also be linked together to form a monocyclic or polycyclic ring having 3-20 carbon atoms including the oxazolidine carbon atom to which $R^2$ and $R^3$ are bonded. Preferably, $R^2$ and $R^3$ are hydrogen or alkyl groups having 1-4 carbon atoms.

$R^4$ may be hydrogen or an alkyl group having 1-4 carbon atoms, hydrogen being preferred.

The mixed organosilicate and 1,3-oxazolidine curing agent are contacted with atmospheric moisture and cure. The exact mechanism by which the 1,3-oxazolidine curing agents of this invention cure (gelling or cross-linking) of the organosilicates is unknown. It is hypothesized that some of the atmospheric moisture which would otherwise hydrolyze some of the alkoxy group-to-silicon bonds of the organosilicate, hydrolyzes the 1,3-oxazolidine to reform the 2-hydroxyalkylamine starting material which then catalyzes the curing reaction. As it is thought that the 1,3-oxazolidine curing agent hydrolyzes to become an amine catalyst, these curing agents may be considered latent amines.

The coating compositions themselves may be prepared by mixing the organosilicate and the above 1,3-oxazolidine curing agent. The amount of organosilicate used in a given coating composition depends upon the particular coating task being performed and the particular organosilicate selected for that task, as are known in the art. The amount of 1,3-oxazolidine curing agent in the composition is also variable with the amount used again depending on the desired coating-film properties and particular organosilicate utilized.

As used herein, the term "atmospheric moisture" is used to include moisture from any source such as dampness in the air, condensation on various surfaces such as that of the substrate, rain, snow, water added to the composition, and the like.

The 1,3-oxazolidine curing agents of the present invention are known compounds and they may be prepared by several methods known to the art. In the preferred method of their preparation, about equimolar amounts of a 2-hydroxy-alkylamine and an aldehyde or ketone are mixed together followed by azeotropic distillation of the water thereby produced using a distilling solvent such as benzene. The reaction is set forth below wherein $R^1$, $R^2$, $R^3$ and $R^4$ have their previously set forth meanings:

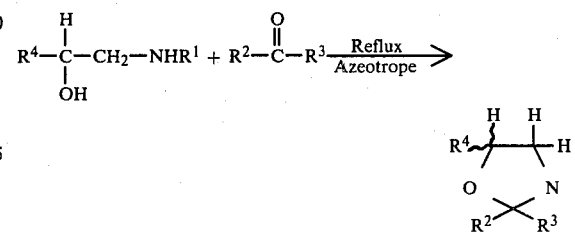

While the synthesis of 1,3-oxazolidine curing agents is not a feature of this invention, for the sake of clarity and understanding of how the various substituent $R^1$, $R^2$, $R^3$ and $R^4$ groups may be introduced into the curing agent molecules, the following discussion will focus upon the precurser molecules which may be used in synthesizing the various 1,3-oxazolidine curing agents of this invention, following the above described preferred synthesis.

As stated before, $R^1$ may be hydrogen, or a branched, straight chain or cyclic monovalent alkyl or aryl group having 1–20 carbon atoms. In preferred practice, $R^4$ is hydrogen so the 2-hydroxyalkylamine is a derivative of 2-hydroxyethylamine. Using 2-hydroxyethylamine as illustrative ($R^4$ being hydrogen), the 2-hydroxyethylamine may be 2-hydroxyethylamine itself, diethanolamine, N-lauryl-2-hydroxyethylamine, N-(meta-chlorophenyl)-2-hydroxyethylamine, N-iso-propyl-2-hydroxyethylamine, N-cyclohexyl-2-hydroxyethylamine and the like. It is preferred that $R^1$ be a monovalent alkyl group having 1–6 carbon atoms and thus, compounds such as N-ethyl-2-hydroxyethylamine, diethanolamine, N-iso-propyl-2-hydroxyethylamine and the like are preferred.

$R^4$ may be hydrogen or an alkyl group having 1–4 carbon atoms. As $R^4$ is preferably hydrogen, the above-described 2-hydroxyethylamines would be utilized in the preferred synthesis. Illustrative examples of amines which may be utilized in the preferred synthesis when $R^4$ is not hydrogen include 2-hydroxypropylamine, N-ethyl-2-hydroxybutylamine, N-iso-propyl-2-hydroxypentylamine, 2-hydroxyhexylamine, and the like.

The $R^2$ and $R^3$ groups of the 1,3-oxazolidine curing agent may be the same or different. These groups may be selected from hydrogen, or branched, straight chain and cyclic alkyl and aryl groups having 1–10 carbon atoms each. Additionally, $R^2$ and $R^3$ may be linked together to form a monocyclic or polycyclic ring having 3–20 carbon atoms including the 1,3-oxazolidine carbon atom (1,3-oxazolidine atom 2) to which $R^2$ and $R^3$ are bonded.

Looking again illustratively at the before set out preferred synthetic reaction for the preparation of the 1,3-oxazolidine curing agents of this invention, $R^2$ and $R^3$ may be the same when formaldehyde or acetone are used in the reaction. One of the $R^2$ or $R^3$ groups may be branched and the other hydrogen when iso-butyraldehyde is used, or one group may be phenyl (aryl) and the other ethyl (alkyl) when ethyl phenyl ketone (propiophenone) is a reactant. Additionally, $R^2$ and $R^3$ may be linked together to form a monocyclic ring with the carbon atom of the 1,3-oxazolidine to which they are bonded (the 2-atom of the 1,3-oxizolidine ring) when cyclohexanone is used, or they may similarly form a polycyclic ring when a ketone such as alpha-tetralone is used.

In preferred practice, $R^2$ and $R^3$ are selected from hydrogen, or alkyl groups, each alkyl group having 1–4 carbon atoms. In most preferred practice, $R^2$ and $R^3$ are both hydrogen, or the sum of the carbon atoms of the alkyl groups of $R^2$ plus $R^3$ is less than or equal to 4. Thus, aldehydes such as formaldehyde and iso-butyraldehyde and ketones such as acetone, methyl ethyl ketone and diethyl ketone may be used to produce the most preferred curing agents by the before set out synthetic reaction for 1,3-oxazolidine production, while ketones such as dipropyl ketone or dibutyl ketone may be used to produce 1,3-oxazolidine curing agents which are preferred.

The uncured organosilicate resin components of the present invention are themselves well known, and include those alkoxy-substituted silicon compounds which contain a plurality of alkoxy group-to-silicon bonds which will hydrolyze in the presence of atmospheric moisture. Many of these are alkoxy-substituted polysiloxanes having the unit formula:

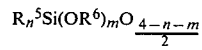

wherein $R^5$ is an inert monovalent organic radical, and preferably saturated, $R^6$ is one or a mixture of $C_1$–$C_8$ alkyl groups, preferably $C_1$–$C_4$ alkyl groups, n has an average value of about 0.5 to about 1.9, m has an average value of at least 0.1 to about 2.5, the sum of m plus n being 0.51 to 3, and there being an average of at least 1.2 $R^6$ groups present per alkoxy-substituted polysiloxane molecule. The $R^5$ group may be illustrated by methyl, ethyl or phenyl, and the $OR^6$ group by methoxy, ethoxy, 2-ethoxyethyl and the like.

In the above description the preferred value for m is from about 0.5 to about 1.1 and the average number of $R^6$ groups per molecule is less than 10, and is preferably in the range of from 2–8.

The preferred polysiloxane materials have the formula:

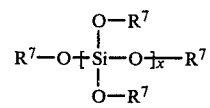

wherein $R^7$ is selected from 2-ethoxyethyl, ethyl and mixtures thereof, and x is a number from 2–10, preferably about 2–8. The product designated Cellosolve Silicate X-8018 of Union Carbide Corporation will illustrate these preferred polysiloxane materials.

Organic solution coatings in which the organosilicate resin is dissolved in a volatile organic solvent are also useful herein and may be illustrated by solution copolymers of monoethylenically unsaturated monomers, such as styrene, with hydroxy functional monomers, such as 2-hydroxyethyl acrylate. These copolymers can be reacted with the alkoxy-substituted polysiloxanes to bond the siloxane to the copolymer. The provision of solution copolymers is more fully illustrated in Canadian Pat. No. 868,976, issued Apr. 20, 1971. On the other hand, the 2-hydroxyethyl acrylate can be condensed with the siloxane and the copolymerized.

The compositions of this invention may be prepared by simply mixing the 1,3-oxazolidine catalytic curing agent with the organosilicate. In preferred practice however, these two ingredients are mixed in the presence of non-reactive solvents such as mineral spirits, alkylated glycol ethers such as 2-ethoxyethanol or 2-methoxyethanol or alcohols such as ethanol, propanol and the like. Preferably, these solvents, or at least any solvents used in conjunction with the organosilicate, are anhydrous.

Not only are the curing agent and organosilicate preferably mixed in non-reactive solvents, one or the other or both are also preferably dissolved or suspended in such solvents prior to mixing. Thus, for a two package product, either or both the curing agent and organosilicate may be in a non-reactive solvent so that after mixing both components are dissolved or dispersed in the solvent. During or after the mixing step, the mixed coating composition contacts atmospheric moisture and then cures with catalysis by the 1,3-oxazolidine curing agent. Of course, the non-reactive solvent may be added to a two package product during or after mixing of the organosilicate and 1,3-oxazolidine. In a one package product, the 1,3-oxazolidine curing agent, organosilicate and non-reactive solvent are mixed together under anhydrous conditions and stored in a container which prevents the ingress of atmospheric moisture. This mixed coating composition may then be used to coat a substrate, whereupon it will contact atmospheric moisture and cure.

BEST MODES FOR CARRYING OUT THE INVENTION

Example 1: Preparation of 1,3-Oxazolidine Curing Agents

A. 2-Iso-propyl-3-ethyl-1,3-oxazolidine

Iso-butyraldehyde (11.1 g; 0.15 moles) was added slowly over a period of 1 hour to N-ethyl-2-hydroxyethylamine (13.3 g; 0.15 moles) at a temperature of 25°–30° C. Benzene (100 ml) was then added, and the resulting solution was heated to reflux. Continuous azeotropic distillation removed 2.8 ml of water. The benzene was then removed by vacuum distillation to give the desired 2-isopropyl-3-ethyl-1,3-oxazolidine as a yellow liquid.

B. 3-Ethyl-1,3-oxazolidine

A solution of 37% by weight of aqueous formaldehyde (16.2 g; 0.2 moles) was added to N-ethyl-2-hydroxyethylamine at room temperature over a period of 30 minutes. Benzene (100 ml) was added and the resulting mixture was continuously azeotropically distilled to remove the added water from the formaldehyde and that produced by the reaction. Benzene and the desired 3-ethyl-1,3-oxazolidine (b.p. 114°–120° C.) were separated by distillation.

PREPARATION OF KETIMINE CATALYTIC CURING AGENTS FOR COMPARATIVE STUDIES

Example 2:

A. Ketimine from Hexamethylanediamine and Methyl Iso-butyl Ketone

A solution of hexamethylenediamine (11.6 g; 0.1 moles) and methyl iso-butyl ketone (30 g; 0.3 moles) in 100 ml of benzene was heated at reflux for 5 hours in the presence of Dowex 50W-X8 (Dow Chemical Company) ion-exchange resin. During this time period, 4.5 ml of water were removed by continuous azeotropic distillation. On cooling, the ion exchange resin was removed by gravity filtration, and the benzene was removed by vacuum distillation to yield a yellow liquid.

B. Ketimine from Diethylenetriamine and Methyl Iso-butyl Ketone

Diethylenetriamine, methyl iso-butyl ketone, benzene and the ion-exchange resin were mixed, held at reflux with azeotropic distillation of water as discussed above. The product was then isolated by vacuum distillation as is also discussed above.

Example 3: Pot Life Studies

Pot life studies were conducted using model coating compositions based upon an organosilicate having a plurality of atmospheric moisture hydrolyzable alkoxy group-to-silicon bonds and various catalytic curing agents. These compositions were prepared containing the ingredients in Table 1, below. After mixing, the pot life in a container open to atmospheric moisture was measured as the time for onset of visible gelation. The results of these studies is set forth in Table 2, below.

TABLE 1

| Model Coating Composition | |
|---|---|
| Components | Amounts (grams) |
| Cellosolve Silicate X-8018 (Note 1) | 11.4 |
| Mineral Spirits | 12.1 |
| Ethanol (absolute) | 12.2 |
| 2-Ethoxyethanol | 12.2 |
| Curing Catalyst (Table 2) | 1.7 |
| | 49.7 |

TABLE 2

| Model Coating Gel Times | |
|---|---|
| Curing Catalyst | Gel Time (minutes) |
| Ethanolamine | 3.8 |
| Ketimines (Example 2) | |
| (a) Example 2-A | 5 |
| (b) Example 2-B | 15–20 |
| 1,3-Oxazolidines | |
| (a) Example 1-A | 40–45 |
| (b) Example 1-B | 60 |
| (c) 2-Methyl-2-iso-propyl-3-ethyl-1,3-oxazolidine (Note 2) | 40–45 |
| (d) 3-(2-hydroxy-ethyl)-1,3-oxazolidine (Note 3) | 120 |

As can easily be seen from the gel times in Table 2, above, the 1,3-oxazolidine curing agents of this invention prolong the pot life of the model coatings dramatically. The pot life for the compositions of this invention are at least twice that of the longest pot life of the other compositions tested.

The compositions of Example 3 containing the 1,3-oxazolidine curing agents of the invention are coated onto steel panels (Parker test panels EP-2, cold rolled steel-Bonderite neutral, deionized water rinsed), allowed to come into contact with atmospheric moisture and thereby cure.

I claim:

1. An anhydrous curable organosilicate coating composition comprising an organosilicate having a plurality of atmospheric moisture hydrolyzable alkoxy group-to-silicon bonds and about 1% to about 50% by weight of said organosilicate of a 1,3-oxazolidine curing agent having the formula:

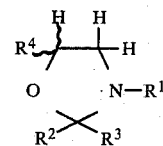

wherein
$R^1$ is selected from the group consisting of hydrogen, branched, straight chain and cyclic monovalent alkyl, and aryl groups having 1–20 carbon atoms,
$R^2$ and $R^3$ are the same or different and are selected from the group consisting of hydrogen, branched, straight chain and cyclic alkyl and aryl groups having 1–10 carbon atoms each, and $R^2$ and $R^3$ may be linked together to form a monocyclic or polycyclic ring structure having 3–20 carbon atoms including the 1,3-oxazolidine carbon atom to which $R^2$ and $R^3$ are bonded, and $R^4$ is hydrogen or an alkyl group having 1–4 carbon atoms;

said composition curing in the presence of atmospheric moisture.

2. The composition according to claim 1 wherein said organosilicate is an alkoxy-substituted polysiloxane having the unit formula:

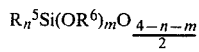

wherein $R^5$ is a monovalent organic radical, $R^6$ is one or a mixture of $C_1$–$C_8$ alkyl groups, n has an average value of about 0.5 to about 1.9, m has an average value of at least 0.1 to about 2.5, the sum of m plus n being 0.51 to 3, and there being an average of at least 1.2 $R^6$ groups present per alkoxy-substituted polysiloxane.

3. The composition according to claim 1 wherein $R^1$ is selected from the group consisting of branched and straight chain monovalent alkyl groups having 1–6 carbon atoms; and $R^2$ and $R^3$ are the same or different and are selected from the group consisting of hydrogen, branched and straight chain monovalent alkyl groups each having 1–4 carbon atoms.

4. An anhydrous curable polysiloxane coating composition comprising a polysiloxane having a unit formula:

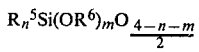

wherein $R^5$ is a monovalent saturated organic radical, $R^6$ is one or more of a mixture of $C_1$–$C_8$ alkyl groups, n has an average value of about 0.5 to about 1.9, m has an average value of at least 0.1 to about 2.5, the sum of m plus n being 0.51 to 3, and there being an average of at least 1.2 $R^6$ groups present per alkoxy-substituted polysiloxane; and a curing agent present at about 10% to about 20% by weight of said polysiloxane, said curing agent having the formula:

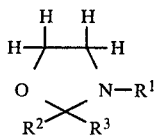

wherein $R^1$ is selected from the group consisting of branched and straight chain monovalent alkyl groups having 1–6 carbon atoms, and $R^2$ and $R^3$ are the same or different and are selected from the group consisting of hydrogen, branched and straight chain alkyl groups each having 1–4 carbons;

said composition curing in the presence of atmospheric moisture.

5. The composition according to claim 4 wherein $R^6$ is one or more of $C_1$–$C_4$ alkyl groups, the average number of $R^6$ groups per molecule is 2–8, and m has a value of from about 0.5 to about 1.1.

6. The composition according to claim 1 wherein said organosilicate is a polysiloxane having the formula:

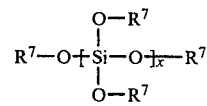

wherein $R^7$ is selected from the group consisting of 2-ethoxyethyl, ethyl and mixtures thereof; and x is a number from 2–10.

7. The composition according to claim 1 additionally comprising non-reactive solvent.

8. A anhydrous curable polysiloxane coating composition comprising a non-reactive solvent having dispersed or dissolved therein a polysiloxane having the formula:

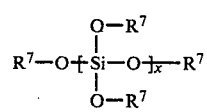

wherein $R^7$ is selected from the group consisting of 2-ethoxyethyl, ethyl and mixtures thereof, and x is a number from 2–8; and about 10% to about 20% by weight based upon said polysiloxane of a 1,3-oxazolidine curing agent having the formula:

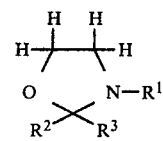

wherein $R^1$ is selected from the group consisting of branched and straight chain monovalent alkyl groups having 1–6 carbon atoms; and $R^2$ and $R^3$ are the same or different, and are selected from the group consisting of hydrogen, branched and straight chain monovalent alkyl groups wherein the sum of the carbon atoms in both $R^2$ and $R^3$ groups is less than or equal to 4;

said composition curing in the presence of atmospheric moisture.

9. The composition according to claim 8 additionally comprising a non-reactive solvent, said composition being anhydrous and stored in a container preventing ingress of atmospheric moisture.

10. A method of curing the organosilicate coating composition of claim 1 which comprises exposing said composition to an atmosphere containing moisture.

* * * * *

UNITED STATES PATENT AND TRADEMARK OFFICE
CERTIFICATE OF CORRECTION

PATENT NO. : 4,311,827
DATED : January 19, 1982
INVENTOR(S) : Gerry K. Noren

It is certified that error appears in the above—identified patent and that said Letters Patent is hereby corrected as shown below:

Column 4, line 44, change "the" to --then--

Column 6, after line 31, add

--Note 1. Cellosolve Silicate X-8018 is sold by Union Carbide Corporation, and its structure is set forth hereinbefore.

Note 2. 2-Methyl-2-iso-propyl-3-ethyl 1,3-oxazolidine was prepared from methyl iso-propyl ketone and N-ethyl-2-hydroxyethylamine in a manner analogous to that used in Example 1-A.

Note 3. 3-(2-hydroxyethyl)-1,3-oxazolidine was prepared from diethanolamine and aqueous formaldehyde in a manner analogous to that used in Example 1-B.--

Column 8, line 20, change "A: to --An--.

Signed and Sealed this

Eleventh Day of May 1982

[SEAL]

Attest:

GERALD J. MOSSINGHOFF

*Attesting Officer*   *Commissioner of Patents and Trademarks*